Feb. 7, 1961  W. T. SCHRUM, SR  2,970,483
ROTARY DRILL AND IMPACT TOOL
Filed Feb. 17, 1959  2 Sheets-Sheet 1
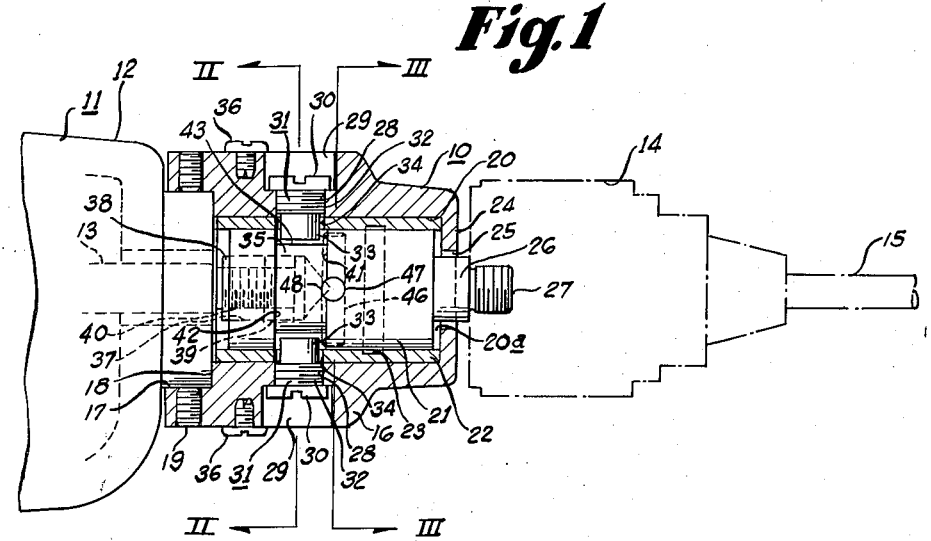
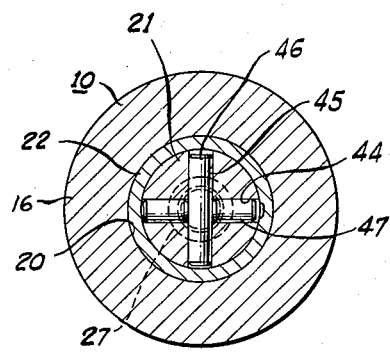
INVENTOR.
WILBUR T. SCHRUM SR.
BY
his attorneys Feb. 7, 1961    W. T. SCHRUM, SR    2,970,483
ROTARY DRILL AND IMPACT TOOL
Filed Feb. 17, 1959    2 Sheets-Sheet 2

INVENTOR.
WILBUR T. SCHRUM SR.
BY Hooply Leonard & Buell
his attorneys

United States Patent Office 2,970,483
Patented Feb. 7, 1961

2,970,483

ROTARY DRILL AND IMPACT TOOL

Wilbur T. Schrum, Sr., Derry, Pa., assignor to Impact Rotor Tool Inc., Latrobe, Pa., a corporation of Pennsylvania Filed Feb. 17, 1959, Ser. No. 793,726

8 Claims. (Cl. 74—22)

This invention relates to a rotary drill and impact tool for drilling with or without, optionally, axial impacting movement thereof. More particularly, this invention pertains to an attachment tool to provide, selectively, rotary impact drilling for impact drilling responsive materials such as masonry, concrete, tile or brick, on the one hand, or regular rotary drilling for straight drilling responsive materials including metal, on the other hand, utilizing a conventional portable electric drill or the like in cooperation therewith as a power source.

An embodiment of this invention provides many advantages over prior practices. Thus, a tool of this invention may be attached to a portable electric drill to convert it into a complete rotary drill and impact tool without need for tool or bit changing where masonry or cement materials are to be drilled. Preferably, my attachment is introduced between the electric drille body and a standard chuck member without material decrease in the handling qualities or portability which the original electric drill had. And, the new device may be handled with one hand on required occasions with benefit where the drilling to be done is in out of the way or awkward places to reach. Further, a device embodying my invention may selectively be used as a straight drill or as a rotary impact drill. Still further, a device of this invention applies drilling and impacting pressure in line with the rotational axis of the pressure and of the power source. Detrimental noise and vibration are inhibited and relatively greater reliability with lessened maintenance is obtainable by the use of this invention.

Other objects, features and advantages of this invention will be apparent from the following description and the accompanying drawings, which are illustrative only, in which Figure 1 is a preferred attachment form of my invention applied to a portable electric drill to create a new rotary drill and impact tool;

Figure 2 is a view taken along line II—II of Figure 1;

Figure 3 is a view taken along line III—III of Figure 1;

Figure 4 is a view in perspective of a driving nut to operatively connect the spindle of a standard drill to the rotor of an attachment embodiment of this invention;

Figure 5:
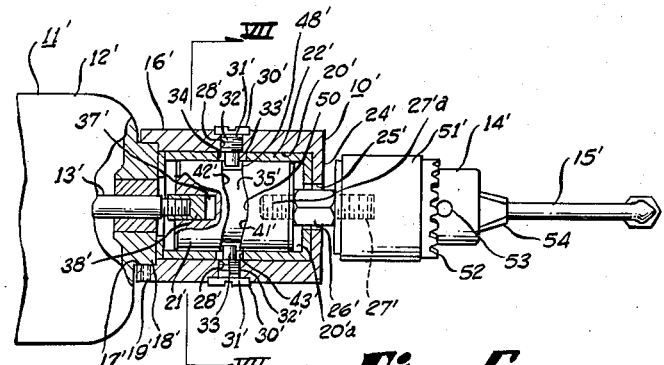
Figure 5 is a view similar to the view shown in Figure 1 of another embodiment of my invention.

Referring to Figures 1 to 4 of the drawings, there is shown therein an attachment tool 10 of my invention which has been applied to a standard portable electric drill 11. Drill 11 has a casing 12 and an armature spindle 13 which originally was directly threaded into and connected at its forward end to a chuck 14 for a drill bit or other cutting tool 15. Such electric drills 11 are commonly provided with a handle and trigger (not shown) to operate a motor in casing 12 and thereby rotate spindle 13. In the embodiment 10 of this invention being described, a housing 16 is provided at the rear thereof with a cylindrical opening 17 to fit over a flange 18 on casing 12 so that attachment 10 may be firmly secured thereto by set screws 19. Other means for securing an embodiment of this invention of an electric drill or other selected prime mover may be used depending upon the shape of the prime mover without in any way changing significant elements of this invention.

Housing 16 is provided with a bore 20 forming a cavity for a cylindrical rotor 21 which is selectively reciprocable therein. A bushing liner 22 with an annular lubricating recess 23 for a grease fitting may be provided for rotor 21. A front wall 24 is provided in housing 16 and has an opening 25 therethrough for a necked portion 26 at the front end of rotor 21. End 26 terminates in a threaded head 27 which screws into the back of chuck 14, or other bit holding member, to rigidly connect the two together so that the chuck 14 and tool 15 are driven in accordance with the movements of rotor 21.

Rotor 21 is shorter than the length of the cavity 20a inside of liner 22 to enable it to reciprocate while being rotated when the tool is used with both rotary and impacting action. The side walls of housing 16 are provided with drilled and tapped openings 28 in transverse alignment in the embodiment being described with the outer ends 29 thereof counterbored to accommodate enlarged heads 30 of respective impact projection members 31 which act somewhat as followers to guide or cause reciprocation of rotor 21 when members 31 are in projecting position. Members 31 are provided with a threaded portion 32 to engage the threaded portions of the openings 28 and with inwardly unthreaded posts 33. When the members 31 are screwed inwardly as shown in Figure 1, the posts 33 extend through openings 34 in liners 22 and project into a transversely straight peripheral groove 35 in rotor 21 intermediate the ends thereof. On the other hand, when the members 31 are withdrawn, after being unscrewed as shown in Figure 2, they are wholly outside of such groove 35. Stop screws 36 may be provided with the heads thereof overlying the edge of counterbore 29 to limit the extent to which the members 31 can be unscrewed to prevent inadvertment separation from the balance of the attachment tool 10. If desired, the members 31 may instead be made to stay in any adjusted position regardless of any shaking or vibration thereof during operation.

The rear end of rotor 21 is provided with an axial recess 37 which is oval in end view to accommodate a somewhat smaller oval member 38 in slidable relation thereto. Member 38 is the head at the front of a connector 39 having a tapped axial opening therethrough to receive and engage the threaded end 40 of spindle 13. When head 38 is in recess 37, any rotation of spindle 13 will correspondingly rotate rotor 21. Further, the length of recess 37 permits rotor 21 to slide axially relative to spindle 13 and connector 39 without disconnection from head 38.

Groove 35 has a rearwardly facing peripheral shoulder 41 operating as a forward wall, a forwardly facing peripheral shoulder 42 and a bottom 43. Rotor 21 is cross drilled forwardly of but adjacent shoulder 41 at 44 and 45, the centers of such cross holes being close enough to shoulder 41 as to make the plane of that shoulder act as a chord to subtend an arc from the circumference of such cross holes. Such cross holes are provided with cross pins 46 and 47 respectively so that segments 48 of all thereof face rearwardly and extend into groove 35 to constitute angularly spaced rise portions therein. Preferably, the pins are left free to rotate. When the members 31 are in the projecting position shown in Figure 1 and the motor in casing 12 is energized while a user presses tool bit 15 against work such as masonry, the rise portions 48 in the course of the turning of rotor 21 will engage the posts 33 and provide both rotation and impact drilling at one and the same time for the easy penetration of such work by bit 15. If a user pulls tool 15 away from the work and lets the front of the tool drop, rotor 21 will tend to slide forwardly enough to cause the segments 48 to clear posts 33 even though the motor is still turning thereby avoiding shaking such user's hand during such relief period even though the members 31 are still in projecting position.

When encountering or desiring to drill in a substance such as metal, on the other hand, the members 31 may be adjusted to cause them to withdraw to the position shown in Figure 2. Thereupon, when a user energizes the motor in casing 12 and presses tool 15 against such work, there will be no axial reciprocation of rotor 21 and hence no impacting action and the user will obtain regular or straight rotary drilling. Hence, a user of this invention may readily and conveniently turn from one kind of drilling without impact, to another kind with impact, simply and easily and without changing the tool bit, without having to shift power sources or to utilize different tools for the different types of work to be accomplished. In addition, holes produced by embodiments of this invention are made relatively quickly and precisely and without subjecting the operator to fatigue beyond that experienced with in the use of a conventional drill.

Figure 6:
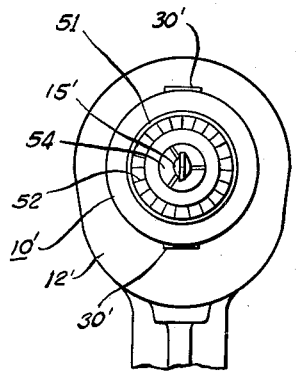
Figure 6 is a front end view of the construction shown in Figure 5.
Figure 7:
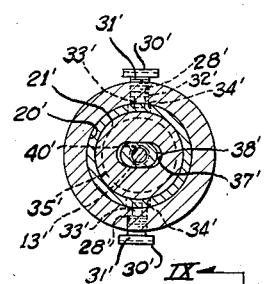
Figure 7 is a view in section taken along line VII—VII of Figure 5.

A further embodiment of my invention is illustrated in Figures 5 to 7, inclusive, and parts therein coresponding generally in construction and functioning to structural elements shown in the embodiment set forth in Figures 1 to 4, are provided with the same reference numerals with the addition of a prime accent thereto. In such further embodiment, groove 35' is also endless but, in addition, is sinuous when viewed from the side thereof with rise portions 48' consisting of the rearmost portions of the rearwardly facing shoulder surface 41'. The foremost portions 50 of the shoulder surface 41' are "fall" portions and are connected by shoulder surface 41' to such rise portions in a gradual manner in the course of the rotation of rotor 21' due to the sinuosity of such shoulder surface 41'. Forwardly facing shoulder surface 42' is correspondingly sinuous for cooperation in an opposite direction with post 33'. Hence, in the case of such further embodiment and unlike the embodiment of Figures 1 to 4, the members 31' must have the posts 33' withdrawn from the sinuous groove 35' even when the front of the tool attachment 10' is lowered away from the work if the rotor 21' is not to axially reciprocate during continued energization of the motor in casing 12'. Chuck 14' is illustrated in the form of a Jacob's chuck with a ferrule 51 having crown teeth 52 to engage a toothed key when the tip of the shaft thereof is turned in opening 53, to open or close the jaws 54, as desired, to release or grip tool bit 15', respectively. Further, neck 26' is shown in such further embodiment in the form of a stud connection having a threaded rearwardly extending end 27'a to rigidly engage rotor 21' and a forward end 27' to rigidly engage chuck 14'. Neck 26' may be provided with a squared surface to enable it to be readily gripped by a spanner wrench.

Figure 8:
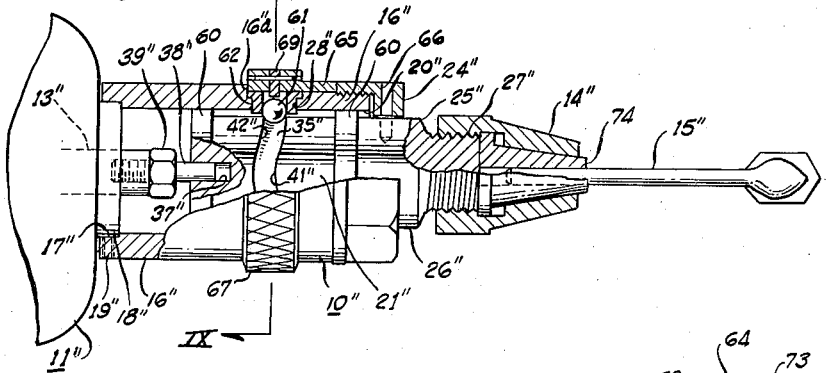
Figure 8 is a view similar to the view shown in Figure 5 of a still further embodiment of this invention.
Figure 10:
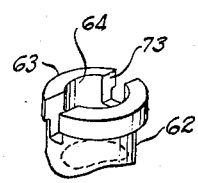
Figure 10 is a view of a cooperating fitting utilized in the embodiment illustrated in Figures 8 and 9.
Figure 9:
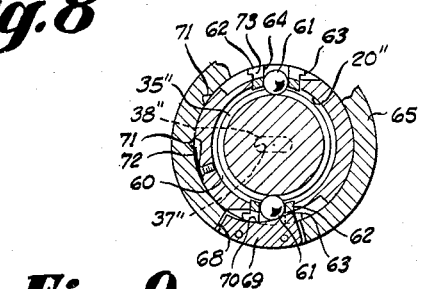
Figure 9 is a view in section taken along line IX—IX of Figure 8.

A still further embodiment of my invention is illustrated in Figures 8 to 10 and parts thereof corresponding generally in construction and in functioning to structural elements shown in the embodiment of Figures 1 to 4 are provided with the same reference numerals with the addition of a double accent thereto. In such still further embodiment, spindle 13" is provided at its forward end with an extension 39" having an oval connector portion 38' in front which engages the axially extending oval recess 37" in rotor 21" to drive rotor 21". The front and back faces of rotor 21" are flanged at 60 to bear against the finished inner surface of bore cavity 20". The body of rotor 21" is provided with an endless sinuous groove 35", which functions in the same manner as sinuous groove 35', in cooperation with ball members 61. Groove 35" is curved semicircularly in cross section for smooth impacting action when the balls 61 are adjusted to project into groove 35".

A retainer fitting 62 having a flanged head 63 is provided for each ball 61, the fittings 62 extending through the openings 28" through the sides of housing 16". A bore 64 through each retainer fitting is wide enough to pass the projection members 61 respectively. A retainer sleeve 65 fits around the outside of the main portion of housing 16" which has a shoulder 16"a against which one edge of sleeve 65 seats. The other edge of sleeve 65 is held in place by the removable end wall 24" of housing 16" which is in the form of a cap nut threadably engaging the threaded forward end of the main portion of housing 16", as shown. Nut 24" is provided with an opening 25" which may be bushed or not as desired, and with a lubricating opening 66. A knurled ring 67 is formed on the rearward end of sleeve 65 for ready gripping purposes and is provided with two openings 68 radially therethrough for rivet connection to cams 69 respectively, each having an inclined surface 70 to control the radial distance of a ball 61 from the axis of tool 10". The inner cylindrical surface of sleeve 65 is provided with indents 71 to cooperate with a snap spring 72 fastened to housing 16". In the position shown in Figure 9, the cam surfaces 70 are holding the respective falls 61 in projecting position nearer to the tool axis so that such balls engage groove 35" including the forward shoulder portion 41" thereof. The cams 69 are enabled to have the surface 70 move radially relative to the tool axis by virtue of a kerf 73 provided in the upper portion of each fitting 62 in a peripheral direction. Thus, so long as sleeve 65 is in the position shown in Figure 5, the tool bit 15" will both rotate and reciprocate when the motor of drill 11" is energized because the members 61 will be operatively connected as follower guides with and in the groove 35". On the other hand, when ring 67 is rotated so that the spring 72 engages the indentation 71 shown empty in Figure 9, the rotation of rotor 21" will force balls 61 radially outwardly in bores 64 toward the radially narrower portion of the cams 69 whereby as a user presses tool 15" against the work to be drilled, drilling only without impact reciprocation will take place. In the further embodiment shown, bit 15" is held by jaws 74 in a chuck 14" of another type in cooperation with the threaded end 27" of rotor 21".

Various rotary prime mover means may be utilized as a power source for tool embodiments and attachments of this invention and embodiments of my invention also may be constructed as new whole machines rather than as attachments for existing machines. Further, various changes may be made in aspects of the illustrated embodiments provided without departing from the spirit of my invention or the scope of the appended claims.

I claim:

1. In a rotary drill and impact tool for an electrical drill having a casing and a rotatable spindle, apparatus comprising, in combination, a housing member having an axially extending cavity, means for removably attaching said housing member to said casing, a rotor in said cavity, said rotor being shorter than said cavity, disconnectable means for operatively connecting said rotor to said spindle in relatively slidable axial alignment therewith, means for rigidly attaching a bit holder to the front of said rotor in axial alignment therewith, rearwardly facing peripheral shoulder means on said rotor, said shoulder means having peripherally spaced rise portions, withdrawable projection means operatively connected to said housing for substantially radial movement selectively into a position projecting into the path of said rise portions of said shoulder means when said rotor is rotated and said housing is pressed toward a workpiece, and means for axially operatively separating said projection means from said rise portions without withdrawing said means from said projecting position.

2. In a rotary drill and impact tool, apparatus comprising, in combination, a housing member having an axially extending cavity, means for removably attaching said housing member to a rotary power spindle, a rotor in said cavity, said rotor being shorter than said cavity, means for operatively connecting said rotor to said spindle in axially slidable relation thereto to rotate therewith, means for rigidly connecting a bit holder to the front of said rotor, a rearwardly facing rise portion on said rotor, projection means operatively connected to said housing for transverse movement selectively into a position projecting into the path of movement of said rise portion when said rotor is rotated and said housing is pressed toward a workpiece, and means for axially operatively separating said projection means from said rise portion without withdrawing said projection means from said projecting position.

3. In a rotary drill and impact tool, apparatus comprising, in combination, a cylindrical housing, a rotatable and selectively reciprocable member in said housing, said member having endless surface means extending peripherally around said member with portions at selectively varied axial distances from a plane normal to the axis of said member, projection means movably connected to said housing for selective transverse movement into the path of and behind said portions, means for operatively connecting the back portion of said member in axially slidable non-rotatable relation to a rotatable prime mover shaft, means for operatively connecting the front portion of said member to a bit holder to move therewith in aligned relation, and means to limit the axial movement of said member in said housing.

4. In a rotary drill and impact tool, apparatus comprising, in combination, a cylindrical housing having a bore therein open at the rear end thereof and generally closed at the front end thereof, means for operatively connecting the rear end of said housing to a prime mover, a rotatable and selectively reciprocable member in said bore, said member being shorter than said bore and having endless groove means extending peripherally around said member, projection means movably connected to said housing for selective transverse movement into said groove means, said groove means having uniformly spaced forward and rear surface portions at different distances respectively from a plane normal to the axis of said member, means for operatively connecting the back end of said member in axially slidable and non-rotatable relation to a rotatable shaft in said prime mover, and means for operatively connecting the front end of said member to a bit holder, said last-named means having a portion extending through said front end of said housing.

5. In a rotary drill and impact tool for an electrical drill having a casing and a rotating spindle, apparatus comprising, in combination, a housing member having an axially extending bore, means for attaching said housing member to said casing, a cylindrical selectively reciprocable rotor in said bore, said rotor being shorter than said bore, non-circular recess means for operatively connecting the back portion of said rotor to said spindle in axially slidable aligned relation, means for operatively connecting a bit holder to the front portion of said rotor in axial alignment to move therewith, endless peripheral groove means with rearwardly facing peripherally spaced rise portions on said rotor, follower guide means extending laterally through said housing into position projecting into the path of said rise portions when said housing member is pressed toward a workpiece, and means for withdrawing said follower guide means from said projecting position.

6. In a rotary drill and impact tool, apparatus comprising, in combination, a cylindrical housing adapted to be attached to a rotary power source, said cylinder having a bore, a selectively reciprocable impact rotor in said bore, said rotor having means at the respective ends thereof for respective operative connection to said power source and a bit holder respectively, said rotor having an endless groove transversely therearound, said groove being sinuous and of uniform width in a transverse view, said sinuosity providing a predetermined axial amplitude to define the extent of reciprocable movement of said rotor, and peripherally spaced follower guides mounted in said housing to extend laterally into engagement with said groove during a rotary impact operation.

7. In a rotary drill and impact tool, apparatus comprising, in combination, a cylindrical housing adapted to be attached to a rotary power source in alignment with the axis of rotation thereof, said cylinder having a bore, a selectively reciprocable impact rotor in said bore, said rotor having means at the respective ends thereof for respective operative axially aligned connection to said power source and a bit holder respectively, said rotor having a straight endless groove extending transversely around the surface thereof, said groove having a rearwardly facing front wall with peripherally spaced radial pin segments, and peripherally spaced impact member mounted in said housing for selective generally radial inward movement to engage said pin segments during a selected rotary impact operation, said groove being at least as wide as the sum of the light of an impact member plus the length of a pin segment measured in the direction of the axis of said rotor.

8. A rotary drill and impact tool as set forth in claim 6, having means for moving said guides out of said groove for a selected regular drilling operation.

References Cited in the file of this patent

UNITED STATES PATENTS

| | | |
|---|---|---|
| 1,656,054 | Gage | Jan. 10, 1928 |
| 1,661,666 | Hachren | Mar. 6, 1928 |
| 2,780,106 | Lovequist | Feb. 5, 1957 |
| 2,869,374 | Morris | Jan. 20, 1959 |

UNITED STATES PATENT OFFICE
CERTIFICATION OF CORRECTION

Patent No. 2,970,483            February 7, 1961

Wilbur T. Schrum, Sr.,

It is hereby certified that error appears in the above numbered patent requiring correction and that the said Letters Patent should read as corrected below.

Column 1, line 31, for "drille" read -- drill --; column 2, line 50, for "inadvertment" read -- inadvertent --; column 6, line 49, for "light" read -- length --; line 59, list of "references cited" for "Hachren" read -- Maehren --.

Signed and sealed this 13th day of June 1961.

(SEAL)
Attest:

ERNEST W. SWIDER            DAVID L. LADD
Attesting Officer            Commissioner of Patents